United States Patent
Watanabe (10) Patent No.: US 11,635,829 B2
(45) Date of Patent: Apr. 25, 2023

(54) POSITION DETECTION DEVICE

(71) Applicant: Wacom Co., Ltd., Saitama (JP)

(72) Inventor: Daisuke Watanabe, Saitama (JP)

(73) Assignee: Wacom Co., Ltd., Saitama (JP)

( * ) Notice: Subject to any disclaimer, the term of this patent is extended or adjusted under 35 U.S.C. 154(b) by 18 days.

(21) Appl. No.: 17/532,848

(22) Filed: Nov. 22, 2021

(65) Prior Publication Data

US 2022/0083160 A1 Mar. 17, 2022

Related U.S. Application Data (63) Continuation of application No. PCT/JP2020/019705, filed on May 19, 2020.

(30) Foreign Application Priority Data

Jun. 20, 2019 (JP) .............................. JP2019-114448

(51) Int. Cl.
   *G06F 3/0354* (2013.01)
   *G06F 3/044* (2006.01)
   *G06F 3/046* (2006.01)

(52) U.S. Cl.
   CPC .......... *G06F 3/03545* (2013.01); *G06F 3/046* (2013.01); *G06F 3/0442* (2019.05)

(58) Field of Classification Search
   CPC ........ G06F 3/0412; G06F 3/041; G06F 3/044; G06F 3/046; G06F 3/0441; G06F 3/0442;
   (Continued)

(56) References Cited

U.S. PATENT DOCUMENTS

2004/0070572 A1 4/2004 Nakajima
2009/0160790 A1 6/2009 Fukushima et al.
(Continued)

FOREIGN PATENT DOCUMENTS

JP 2004-133767 A 4/2004
JP 2009-003796 A 1/2009
(Continued)

OTHER PUBLICATIONS

International Search Report, dated Jul. 21, 2020, for International Application No. PCT/JP2020/019705, 3 pages.

*Primary Examiner* — Koosha Sharifi-Tafreshi
(74) *Attorney, Agent, or Firm* — Seed IP Law Group LLP (57) ABSTRACT

A position detection device includes a position detection sensor that is used with a position indicator and includes a sensor-substrate main body including electrodes and a cable section to which the electrodes are led out. The position detection device includes a circuit board including a position detection circuitry to which the position detection sensor is connected. The sensor-substrate main body includes an insulating substrate having a first surface that is located on a side where a position is to be indicated by the position indicator and a second surface opposite from the first surface. The circuit board is connected to the cable section on a surface of the cable section contiguous with the first surface of the sensor-substrate main body, and when the cable section is bent toward the second surface of the sensor-substrate main body, the circuit board is positioned at a lowermost layer of the position detection device.

8 Claims, 6 Drawing Sheets

(58) Field of Classification Search
CPC .... G06F 3/0443; G06F 3/0444; G06F 3/0445; G06F 3/0446; G06F 3/0447; G06F 2203/04103; G06F 3/04164; G06F 2203/04102; G06F 2203/04111; G06F 3/0416; G06F 2203/04107; H01L 51/0097; H05K 1/189; H05K 1/147; H05K 1/028; H05K 1/0277; H05K 1/0278; H05K 1/0283; H05K 1/0281; H05K 3/361; H05K 1/0216; H05K 3/4691; H05K 1/118; H05K 2201/055; G02F 1/133305; G02F 1/13452; G02F 1/13454; G02F 1/1345

See application file for complete search history.

(56) References Cited

U.S. PATENT DOCUMENTS

| | | | |
|---|---|---|---|
| 2012/0021445 | A1 | 1/2012 | Hogan et al. |
| 2013/0082925 | A1 | 4/2013 | Sato |
| 2017/0139511 | A1 | 5/2017 | Ohsawa et al. |
| 2019/0019855 | A1* | 1/2019 | Park .................. G02F 1/13338 |
| 2020/0356217 | A1* | 11/2020 | Jeong .................. G06F 3/0448 |

FOREIGN PATENT DOCUMENTS

| | | |
|---|---|---|
| JP | 2013-077271 A | 4/2013 |
| JP | 2014-067212 A | 4/2014 |
| JP | 2017-017800 A | 1/2017 |
| WO | 2015/147323 A1 | 10/2015 |

\* cited by examiner

POSITION DETECTION DEVICE

BACKGROUND

Technical Field

The present disclosure relates to a position detection device including a position detection sensor of, for example, an electromagnetic induction type.

Description of the Related Art

A position detection device generally called a pen tablet is used as an input device of an information processing device such as a personal computer. Specifically, the position detection device accepts operation input from an electronic pen, that is, a pen-type position indicator. The position detection device includes a position detection sensor and a position detection circuitry. The position detection sensor includes a sensor-substrate main body and a cable section. The sensor-substrate main body is a portion where a plurality of X-axis direction electrodes and a plurality of Y-axis direction electrodes are arranged. The cable section is a portion where the plurality of X-axis direction electrodes and the plurality of Y-axis direction electrodes arranged on the sensor-substrate main body are led out and bundled together in order to facilitate connection to the position detection circuitry.

In the position detection sensor of the electromagnetic induction type, the above-described X-axis direction electrodes and Y-axis direction electrodes are each configured as a loop coil. The position detection sensor of the electromagnetic induction type alternately enters a transmission period and a reception period. In the transmission period, power is sequentially supplied to the plurality of loop coils in the sensor to generate a magnetic field. In the reception period, the supply of the power is stopped and a magnetic field is received from outside. The electronic pen used with this position detection sensor includes a resonant circuit including a coil and a capacitor. Current flowing through the coil in response to the magnetic field from the position detection sensor generates a signal, which is then transmitted to the position detection sensor.

In the transmission period, the position detection device of the electromagnetic induction type supplies power to the electronic pen to drive the electronic pen. In the reception period, the position detection device of the electromagnetic induction type receives an oscillation signal from the electronic pen to detect the position indicated by the electronic pen and the writing pressure applied to the electronic pen. In the case of the position detection sensor of the electromagnetic induction type configured in this manner, if the position detection sensor and an electronic circuit are arranged in close proximity in an overlapping manner, a problem may occur.

For example, one possible problem is that, during the transmission period, the magnetic field output to the electronic pen from the X-axis direction electrodes and the Y-axis direction electrodes, which are configured as the loop coils of the position detection sensor, may be attenuated due to the effect of a metal portion of the electronic circuit. This problem may weaken the magnetic field to be received by the electronic pen. Another possible problem is that noise generated by the electronic circuit may affect the X-axis direction electrodes and the Y-axis direction electrodes, preventing the accurate detection of the coordinates of the electronic pen.

Japanese Patent Laid-Open No. 2009-003796 (hereinafter, referred to as Patent Document 1) discloses an invention related to a position detection device with a devised magnetic path plate that is disposed between a position detection sensor and an electronic circuit. The magnetic path plate according to the invention disclosed in Patent Document 1 functions as an electromagnetic shield, and prevents the magnetic field generated by an electronic pen and X-axis direction electrodes and Y-axis direction electrodes of the position detection sensor from being attenuated and reduces the effect of external magnetic noise. The magnetic path plate includes an amorphous metal layer and a non-amorphous metal layer.

Figure 6A:
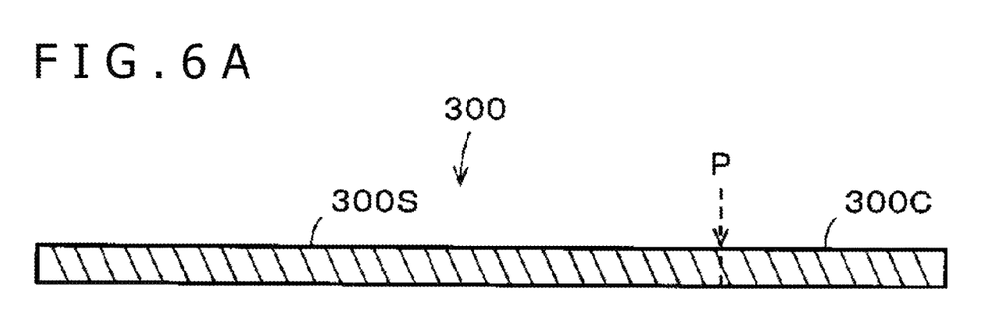
FIGS. 6A and 6B are views for describing an example of a configuration of a conventional position detection device.

In mobile terminals such as smartphones and tablet personal computers (PCs), a position detection device is also mounted as an input device. In recent years, a position detection sensor configured as a lightweight flexible substrate has been used in a position detection device mounted in a mobile terminal. As illustrated in FIG. 6A, in the case of a position detection sensor 300 configured as a flexible substrate, a sensor-substrate main body 300S and a cable section 300C are integrally formed.

For example, when the position detection sensor configured as the flexible substrate is mounted in a mobile terminal including a liquid crystal display (LCD), the sensor-substrate main body 300S of the position detection sensor 300 is configured so as to correspond to the entire surface of the display screen of the LCD such that the entire surface of the display screen of the LCD can be used as an indication input region. In many cases, operation buttons, a speaker as a handset, a lens unit of a camera, and the like are arranged in places other than the display screen of the LCD of the mobile terminal.

Figure 6B:
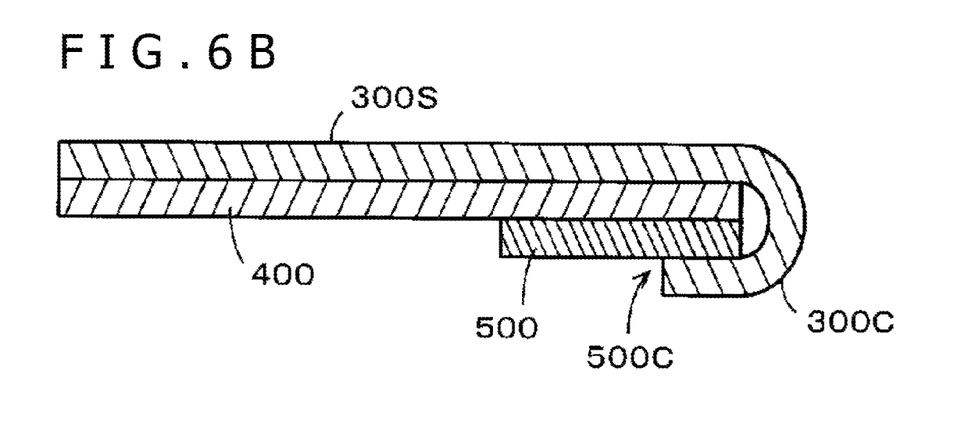

Therefore, it is not possible, in terms of space, to dispose a position detection circuitry, to which the position detection sensor is connected, under the operation buttons, the speaker, and the lens unit. For this reason, as illustrated in FIG. 6B, the cable section 300C of the position detection sensor 300 is bent so as to be connected to, for example, a circuit board 500, on which the position detection circuitry is formed, on the back surface side of the sensor-substrate main body 300S. Therefore, a shield layer 400, which functions as the magnetic path plate described above, is disposed on the lower side of the sensor-substrate main body 300S. The circuit board 500 is positioned on the lower side of the shield layer 400, and the cable section 300C, which is connected to the circuit board 500, is positioned at the lowermost layer.

As illustrated in FIG. 6B, when the cable section 300C is positioned at the lowermost layer, a connection portion 500C between the cable section 300C and the circuit board 500 is positioned at the lowermost layer, and the connection portion 500C is exposed to outside. With this configuration, since noise is easily mixed in from outside or emitted to outside, the connection portion 500C needs to be covered with a shield, which requires more time and effort for the manufacture. Moreover, in recent years, the number of components mounted in mobile terminals equipped with the position detection device has been increasing in order to enhance the performance of the mobile terminals, and the components themselves have been downsized more and more in order to reduce the weight of the mobile terminals. Therefore, it has been considered to configure the position detection circuitry as the circuit board having a stacked structure such as a double-sided board or a four-layer board, rather than a single-sided board, in order to reduce the area of the position detection circuitry.

In this case, the width of the connection portion of the cable section 300C connected to the circuit board becomes narrower, and the arrangement width of the X-axis direction electrodes and the Y-axis direction electrodes also becomes narrower than the conventional case. Since the arrangement width of the X-axis direction electrodes and the Y-axis direction electrodes in the cable section 300C becomes narrower in this manner, these electrodes are more densely disposed, which may cause noise to be mixed in from outside or, conversely, may cause noise to be emitted to outside more easily. Therefore, there is a need for a simple and reliable method that can prevent the function of the position detection device from being deteriorated due to external noise and that can also prevent noise from being emitted from the position detection device to outside regardless of how the shield is disposed.

BRIEF SUMMARY

In view of the foregoing, the present disclosure relates to a position detection device of, for example, an electromagnetic induction type, and it is desirable to provide a highly reliable position detection device that does not allow noise to be mixed in or emitted.

In order to solve the problems described above, there is provided a position detection device including a position detection sensor that is used with a position indicator and includes a sensor-substrate main body including electrodes configured to accept an indication input from the position indicator, and a cable section to which the electrodes are led out; and a circuit board in which a position detection circuitry, to which the position detection sensor is connected, is configured. The sensor-substrate main body of the position detection sensor includes an insulating substrate having a first surface that is located on a side where a position is to be indicated by the position indicator and a second surface that is located on an opposite side of the first surface. Conductors constituting the electrodes are formed on the first surface and the second surface. A shield layer is disposed on an entire surface of the second surface so as to cover the electrodes formed on the second surface. The circuit board is connected to the cable section of the position detection sensor on a surface of the cable section contiguous with the first surface of the sensor-substrate main body, and when the cable section is bent toward the second surface of the sensor-substrate main body, the circuit board is positioned at a lowermost layer of the position detection device.

The position detection device according to an embodiment of the present disclosure includes the position detection sensor and the circuit board in which the position detection circuitry is configured. The position detection sensor includes the sensor-substrate main body and the cable section constituting a connection end to the circuit board. The sensor-substrate main body includes the insulating substrate, and the electrodes are formed by the conductors on each of two sides (the first surface and the second surface) of the insulating substrate. The first surface (front surface) is located on the side where the position is to be indicated by the position indicator, and the second surface (back surface) is located on the opposite side of the first surface.

The shield layer is disposed on the entire surface of the second surface of the sensor-substrate main body so as to cover the electrodes. The circuit board is connected to the cable section on the surface of the cable section contiguous with the first surface, and the cable section is bent toward the second surface of the sensor-substrate main body. Accordingly, the circuit board is positioned at the lowermost layer (exposed to outside). Therefore, the connection portion between the cable section and the circuit board is not positioned at the lowermost layer (not exposed to outside). This configuration can prevent noise from being mixed in from outside and noise from being emitted to outside. Thus, a highly reliable position detection device can be implemented.

DETAILED DESCRIPTION

Example of Configuration of Position Detection Device

Figure 1:
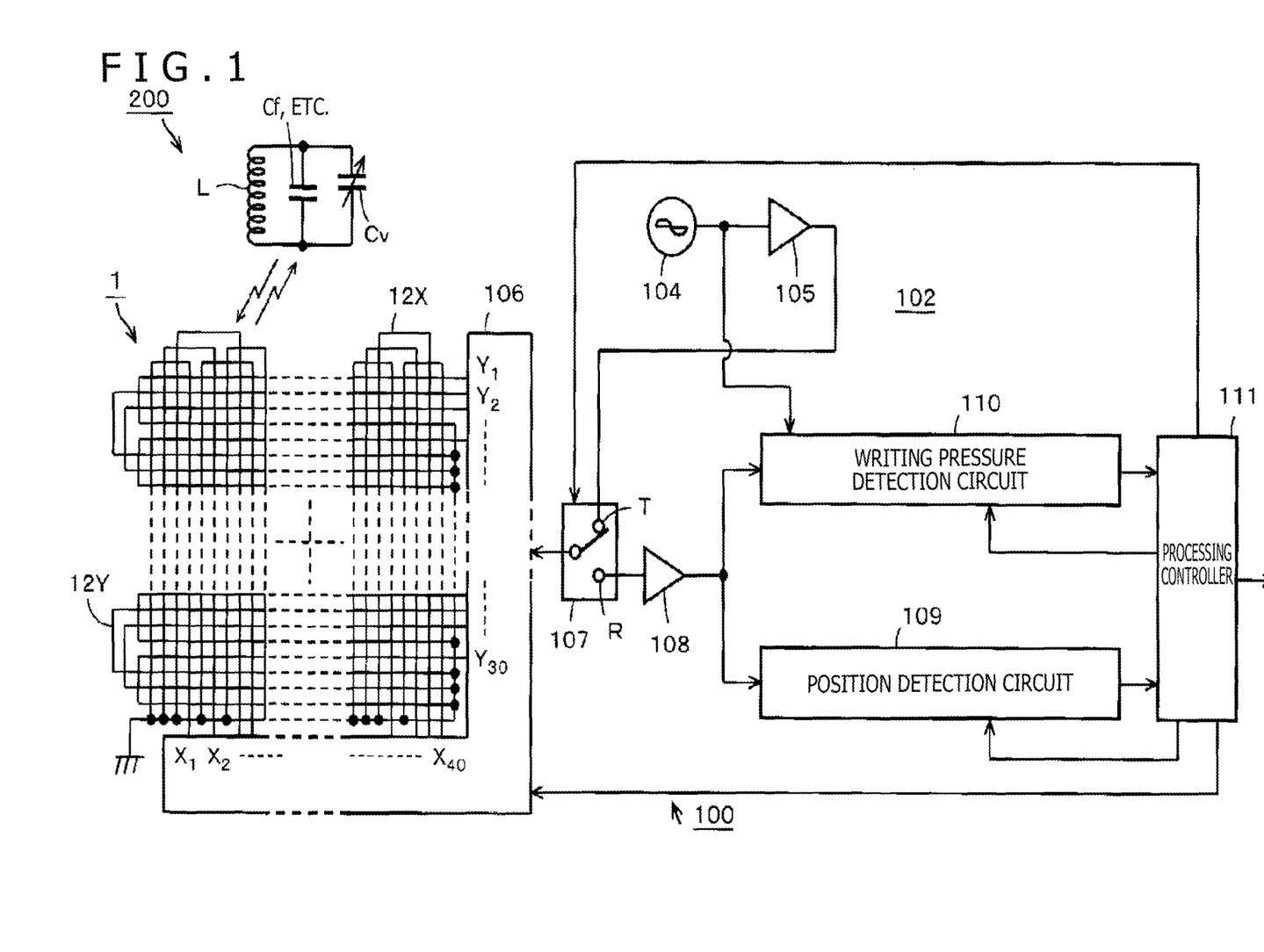
FIG. 1 is a diagram for describing an example of a configuration of a position detection device according to an embodiment of the present disclosure and an example of a configuration of an electronic pen used with the position detection device.

FIG. 1 is a diagram for describing an example of a configuration of a position detection device according to an embodiment of the present disclosure and an example of a configuration of an electronic pen used with the position detection device. In the present embodiment, a position detection device 100 to which an embodiment of the present disclosure is applied and an electronic pen 200 used with the position detection device 100 are of an electromagnetic induction type. As illustrated in the upper left of FIG. 1, the electronic pen 200 includes a resonant circuit in which a coil L for transmitting and receiving signals, a writing pressure detector Cv, which is a variable-capacitance capacitor, a resonant capacitor Cf, and the like are connected to each other in parallel.

The position detection device 100 includes a position detection sensor 1 formed by stacking an X-axis direction loop coil group 12X and a Y-axis direction loop coil group 12Y. Each of loop coils $X_1, X_2, \ldots, X_{40}$ of the X-axis direction loop coil group 12X and loop coils $Y_1, Y_2, \ldots, Y_{30}$ of the Y-axis direction loop coil group 12Y may have one turn or two or more turns. Note that the position detection sensor 1 is illustrated in FIG. 1 in a simplified form, and the detailed configuration of the position detection sensor 1 will be described later. The position detection sensor 1 is connected to a position detection circuitry 102, thereby constituting the position detection device 100 as a whole.

The position detection circuitry 102 includes an oscillator 104, a current driver 105, a selection circuit 106, a switching connection circuit 107, a reception amplifier 108, a position detection circuit 109, a writing pressure detection circuit 110, and a processing controller 111. As illustrated in FIG. 1, the X-axis direction loop coil group 12X and the Y-axis direction loop coil group 12Y of the position detection sensor 1 are connected to the selection circuit 106. The selection circuit 106 sequentially selects one loop coil among the two loop coil groups 12X and 12Y according to the control from the processing controller 111.

The processing controller 111 includes a microprocessor. The processing controller 111 controls the selection of the loop coil in the selection circuit 106, the switching performed by the switching connection circuit 107, and the processing timing in the position detection circuit 109 and the writing pressure detection circuit 110.

The oscillator 104 generates an alternating current (AC) signal of a frequency f0. The oscillator 104 supplies the generated AC signal to the current driver 105 and the writing pressure detection circuit 110. The current driver 105 converts the AC signal supplied from the oscillator 104 into current and supplies the current to the switching connection circuit 107. According to the control from the processing controller 111, the switching connection circuit 107 switches a connection destination (a transmission-side terminal T, a reception-side terminal R) to which the loop coil selected by the selection circuit 106 is connected. Of these connection destinations, the transmission-side terminal T is connected to the current driver 105, while the reception-side terminal R is connected to the reception amplifier 108.

The switching connection circuit 107 switches the connection destination to the transmission-side terminal T in a transmission period and to the reception-side terminal R in a reception period. During the transmission period, the loop coil that has received the current from the current driver 105 through the transmission-side terminal T generates a magnetic field, which is then transmitted to the electronic pen 200 and acts on the resonant circuit of the electronic pen 200. In response, the resonant circuit of the electronic pen 200 generates a position indication signal (radio wave) and transmits the position indication signal to the position detection sensor 1.

In the reception period, the loop coil selected by the selection circuit 106 is connected to the reception amplifier 108 through the reception-side terminal R. While the magnetic field from the electronic pen 200 acts on this loop coil, an induction voltage is generated in this loop coil. This induction voltage is transmitted to the reception amplifier 108 through the selection circuit 106 and the switching connection circuit 107. The reception amplifier 108 amplifies the induction voltage supplied from the loop coil and supplies the amplified induction voltage to the position detection circuit 109 and the writing pressure detection circuit 110.

That is, an induction voltage is generated in each of the loop coils of the X-axis direction loop coil group 12X and the Y-axis direction loop coil group 12Y by the radio wave transmitted from the electronic pen 200. Therefore, the position detection circuit 109 detects the induction voltage (received signal) generated in the loop coil, converts the detected output signal into a digital signal, and outputs the digital signal to the processing controller 111. The processing controller 111 calculates the coordinate values of the position indicated by the electronic pen 200 in the X-axis direction and the Y-axis direction, on the basis of the digital signal received from the position detection circuit 109, that is, the level of the voltage value of the induction voltage generated in each loop coil.

The writing pressure detection circuit 110 detects the output signal of the reception amplifier 108 in synchronization with the AC signal from the oscillator 104 to obtain a signal with a level corresponding to the phase difference (frequency shift) between these signals. The writing pressure detection circuit 110 then converts the signal corresponding to the phase difference (frequency shift) into a digital signal and outputs the digital signal to the processing controller 111. The processing controller 111 detects the writing pressure applied to the electronic pen 200, on the basis of the digital signal from the writing pressure detection circuit 110, that is, the level of the signal corresponding to the phase difference (frequency shift) between the transmitted radio wave and the received radio wave.

In this manner, the position detection circuitry 102 switches between the signal transmission period and the signal reception period. In the transmission period, the position detection circuitry 102 supplies driving power to the electronic pen 200 to drive the electronic pen 200. In the reception period, the position detection circuitry 102 receives a signal from the electronic pen 200 to detect the indicated position and the writing pressure. The position detection circuitry 102 is configured as a circuit board. With this configuration, connecting a cable section 1C of the position detection sensor 1 to the position detection circuitry 102 configured as the circuit board can implement the position detection device, which can then be mounted as an input device in a smartphone, a tablet PC, or the like.

Example of Configuration of Position Detection Sensor

Figure 2A:
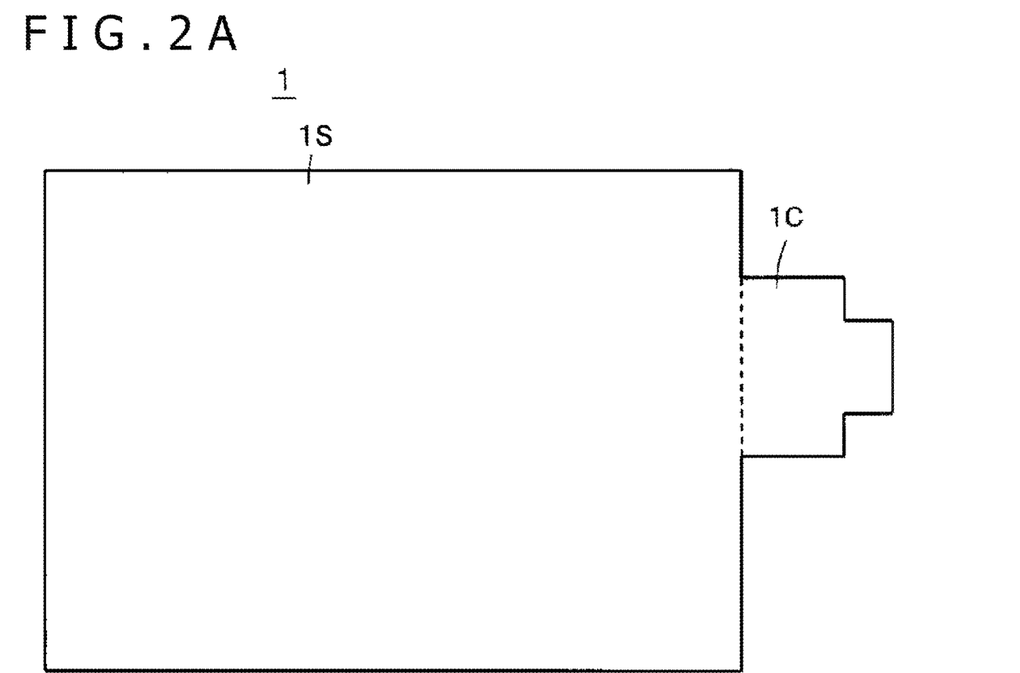
FIGS. 2A to 2C are views for describing a position detection sensor of an electromagnetic induction type used in the position detection device according to the embodiment.
Figure 2B:
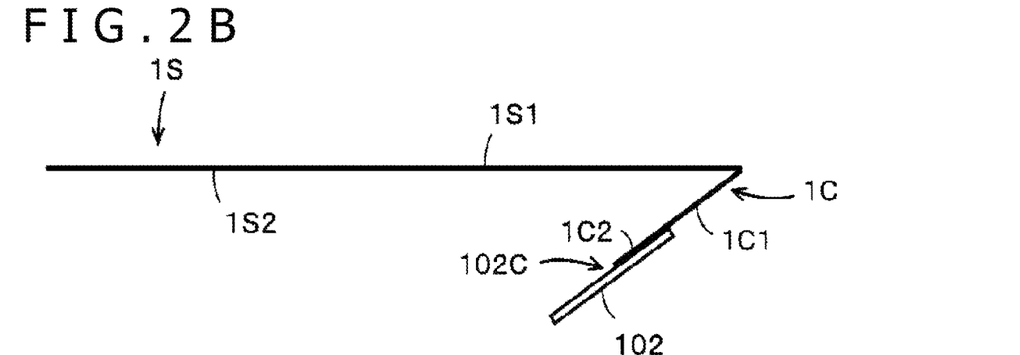
Figure 2C:
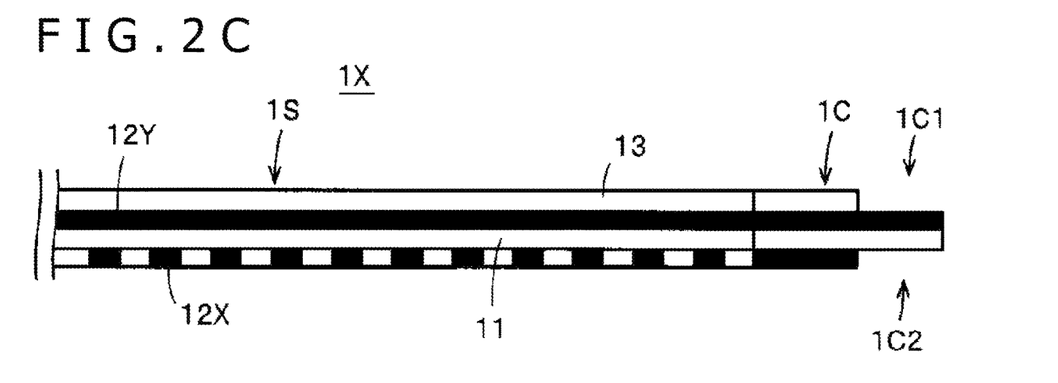

FIGS. 2A to 2C are views for describing a specific example of a configuration of the space-saving position detection sensor 1. Specifically, FIG. 2A is a plan view, FIG. 2B is a side view of the long side, and FIG. 2C is a cross-sectional view of a long-side portion including the cable section 1C. Note that, as will be described in detail later, what is generally called a shield layer (corresponding to the magnetic path plate described above) is disposed on the position detection sensor 1 in order to prevent the magnetic field generated by the electronic pen and the position detection sensor 1 from being attenuated and to reduce the effect of external magnetic noise. In FIGS. 2A to 2C, however, the shield layer is omitted for simplicity of description. In terms of layers, it can be said that the position detection sensor 1 constitutes a sensor layer on which the shield layer is disposed.

The position detection sensor 1 according to the present embodiment is configured as what is generally called a flexible substrate, which is thin and flexible. The position detection sensor 1 can be repeatedly deformed with weak force and can also maintain its electrical characteristics even when deformed. As illustrated in FIG. 2A, the position detection sensor 1 includes a sensor-substrate main body 1S and the cable section 1C. The sensor-substrate main body 1S has a large rectangular shape when viewed from a first surface (operation surface) 1S1 side. The first surface 1S1 is a surface on a side (upper side) where the position is to be indicated by the electronic pen 200. The cable section 1C extends from the sensor-substrate main body 1S. Note that the cable section 1C illustrated in FIG. 2A can be formed in various shapes such as a rectangular shape and a trapezoidal shape.

The sensor-substrate main body 1S includes the coils for electromagnetic coupling with the electronic pen 200 and accepts a position indication input from the electronic pen 200. The cable section 1C constitutes a connection end connected to the position detection circuitry (circuit board) 102 described with reference to FIG. 1 by bundling together line portions (connection line portions) of the feed lines led out from both ends of each coil main body that acts as the coil disposed in the sensor-substrate main body 1S. In other words, the line portions of the feed lines led out from the coils are connected to the selection circuit 106 of the position detection circuitry 102 in order to supply the current from the position detection circuitry 102 to the coils or to supply a signal from the coils to the position detection circuitry 102. In this manner, the cable section 1C facilitates the connection between the coils disposed in the sensor-substrate main body 1S and the position detection circuitry 102.

When the sensor-substrate main body 1S of the position detection sensor 1 is mounted in a mobile terminal such as a smartphone or a tablet PC, the sensor-substrate main body 1S is configured slightly larger than a display screen of a display device such as an LCD so as to correspond to the entire surface of the display screen. Further, there are more and more cases where, when the position detection sensor 1 is mounted in a mobile terminal, the position detection sensor 1 cannot fit into the casing of the mobile terminal with the cable section 1C pulled out. This is due to the fact that the LCD screen is becoming larger, the casing is becoming smaller, and a place to install a camera section and an operation section needs to be secured. For this reason, as illustrated in FIG. 2B, the cable section 1C is bent toward a second surface (back surface) 1S2 of the sensor-substrate main body 1S, which is located on the opposite side of the first surface 1S1 of the sensor-substrate main body 1S, and is connected to the position detection circuitry 102 (circuit board) under the sensor-substrate main body 1S.

Therefore, when the position detection sensor 1 is mounted in a mobile terminal or the like, the second surface 1S2 of the sensor-substrate main body 1S and a second surface 1C2 of the cable section 1C face each other. Specifically, in the state illustrated in FIG. 2A, the first surface 1S1 of the sensor-substrate main body 1S and a first surface 1C1 of the cable section 1C face in the same direction. When the cable section 1C is bent, the first surface 1S1 of the sensor-substrate main body 1S and the first surface 1C1 of the cable section 1C face in the opposite directions.

In this manner, in the present embodiment, the surface of the sensor-substrate main body 1S is distinguished from the surface of the cable section 1C. Accordingly, as illustrated in FIG. 2B, the surface of the cable section 1C contiguous with the first surface 1S1 of the sensor-substrate main body 1S is referred to as the first surface 1C1 of the cable section 1C, while the surface of the cable section 1C contiguous with the second surface 1S2 of the sensor-substrate main body 1S is referred to as the second surface 1C2 of the cable section 1C.

As described above with reference to FIG. 1, the sensor-substrate main body 1S of the position detection sensor 1 is configured by stacking the X-axis direction loop coil group 12X and the Y-axis direction loop coil group 12Y. As illustrated in FIG. 2C, in a sensor layer 1X in which the coils are arranged, the X-axis direction loop coil group 12X is disposed on the second surface (lower surface) of an insulating substrate 11, while the Y-axis direction loop coil group 12Y is disposed on the first surface (upper surface) of the insulating substrate 11. A surface sheet 13 is disposed on the Y-axis direction loop coil group 12Y to protect the Y-axis direction loop coil group 12Y.

Note that, in the cable section 1C, the X-axis direction loop coil group 12X, the insulating substrate 11, the Y-axis direction loop coil group 12Y, and the surface sheet 13 are stacked in this order from the lower side, as with the sensor-substrate main body 1S. The difference is that, in the cable section 1C, the line portion of the feed line of each of the loop coils of the X-axis direction loop coil group 12X and the line portion of the feed line of each of the loop coils of the Y-axis direction loop coil group 12Y are led out in an outward direction (led out to the first surface 1C1 of the cable section 1C) to facilitate the connection to the position detection circuitry 102.

Accordingly, in the present embodiment, the line portion of the feed line of each of the loop coils of the X-axis direction loop coil group 12X and the line portion of the feed line of each of the loop coils of the Y-axis direction loop coil group 12Y are led out to the first surface 1C1. As illustrated in the right side of FIG. 2C, the loop coils of the X-axis direction loop coil group 12X on the second surface 1C2 side are short. This indicates that the line portions of the feed lines of these loop coils are led out to the first surface 1C1. The portion where the surface sheet 13 is not present on the first surface 1C1 side of the cable section 1C is the portion where the line portion of the feed line of each coil connected to a connection portion 102C of the position detection circuitry 102 is exposed. The line portions of the feed lines of all the loop coils led out to this portion of the first surface 1C1 where the surface sheet 13 is not present are connected to the connection portion 102C of the position detection circuitry 102.

In this manner, in the present embodiment, as illustrated in FIG. 2B, the line portions of the feed lines of the coils led out to the first surface 1C1 of the cable section 1C are connected to the connection portion 102C of the position detection circuitry 102 on the first surface 1C1. Unlike the conventional position detection sensor illustrated in FIG. 6B, the connection portion 102C of the position detection circuitry 102, which is connected to the line portions of the feed lines of the coils, is not located on the outer surface of the position detection circuitry 102. The connection portion 102C of the position detection circuitry 102, which is connected to the line portions of the feed lines of the coils, is located on the surface of the position detection circuitry 102 that faces the second surface 1S2 of the sensor-substrate main body 1S, as illustrated in FIG. 2B. With this configuration, the connection portion 102C of the position detection circuitry 102, which is connected to the line portions of the feed lines of the coils, is not exposed to outside. This configuration can, therefore, prevent noise from being mixed in through the connection portion 102C from outside and also prevent noise from being emitted to outside through the connection portion 102C.

In addition, the configuration of the position detection circuitry 102, which will be described in detail later, also helps prevent noise from being mixed in and emitted. Moreover, as illustrated in FIG. 2C, the position detection sensor 1 has a structure in which the X-axis direction loop coil group 12X and the Y-axis direction loop coil group 12Y are stacked. It is necessary to prevent the magnetic field generated by each of the loop coils of the loop coil groups 12X and 12Y from being attenuated by a metal portion of an electronic circuit disposed nearby. Further, it is also necessary to prevent magnetic noise from being mixed in from outside. For this purpose, as described later, the shield layer is disposed on the second surface side, that is, on the lower side of the X-axis direction loop coil group 12X in the example illustrated in FIG. 2C.

Example of Configuration of Position Detection Device 100

FIGS. 3A to 3E are views for describing specific examples of a configuration of the position detection device 100 according to the present embodiment. Specifically, FIGS. 3A to 3E are cross-sectional views when a contiguous portion between the sensor-substrate main body 1S and the cable section 1C of the position detection sensor 1 of the position detection device 100 is cut along a longitudinal direction. In actual implementation, each layer that constitutes the position detection sensor 1 has a thickness of 1 mm or less. As described with reference to FIG. 2B, the cable section 1C is bent toward the second surface 1S2 of the sensor-substrate main body 1S and fixed to the shield layer disposed on the second surface 1S2 side. However, in order to clearly illustrate the stacked structure of the position detection sensor 1, each major layer illustrated in FIGS. 3A to 3E has a certain thickness.

Therefore, although the bent portion of the position detection sensor 1 forms a curve in FIGS. 3A to 3E, the thickness in the direction intersecting the longitudinal direction does not change significantly in actual implementation because the cable section 1C can be bent as if thick paper were bent as illustrated in FIG. 2B. In addition, as described above, the thickness of each layer constituting the position detection sensor 1 is as thin as 1 mm or less. Therefore, even when the cable section 1C is bent as illustrated in FIGS. 3A to 3E, the length of each layer in the longitudinal direction does not differ significantly.

In FIGS. 3A to 3E, the sensor layer 1X, which is the uppermost layer, has the stacked structure described with reference to FIG. 2C. In FIGS. 3A to 3E, the position P indicated by an arrow indicates the boundary position between the sensor-substrate main body 1S and the cable section 1C. Therefore, in FIGS. 3A to 3E, the left side of the position P represents the sensor-substrate main body 1S, while the right side of the position P (the bent portion) represents the cable section 1C.

First Example of Position Detection Device 100

Figure 3A:
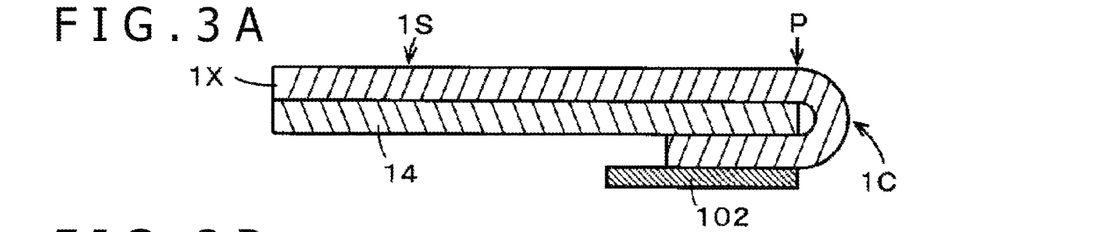
FIGS. 3A to 3E are cross-sectional views for describing specific examples of a configuration of the position detection device according to the embodiment.

FIG. 3A illustrates a first example of the position detection device 100. In the first example of the position detection device 100, a magnetic powder material layer 14 is formed as the shield layer so as to cover the X-axis direction loop coil group 12X formed on the second surface 1S2 of the sensor-substrate main body 1S of the sensor layer 1X. Therefore, the magnetic powder material layer 14 does not cover the second surface 1C2 of the cable section 1C.

As illustrated in FIG. 3A, when the cable section 1C is bent toward the second surface 1S2 of the sensor-substrate main body 1S, the second surface 1S2 of the sensor-substrate main body 1S and the second surface 1C2 of the cable section 1C face each other across the magnetic powder material layer 14. One end of each of the loop coils of the X-axis direction loop coil group 12X and the Y-axis direction loop coil group 12Y on the first surface 1C1 of the cable section 1C is connected to the selection circuit 106 through the connection portion 102C of the position detection circuitry 102, and the other end is grounded.

The magnetic powder material layer 14 is a mixture of a magnetic powder with high permeability, such as an amorphous alloy powder, and a non-magnetic and non-conductive polymer material, such as resin in this example. In the present embodiment, the magnetic powder material is provided in the form of a coating material, and the magnetic powder material in the coating-material form is applied so as to cover the entire X-axis direction loop coil group 12X formed on the second surface 1S of the sensor layer 1X to form the magnetic powder material layer 14. In other examples of the position detection sensor 1 described below, magnetic powder material layers 14A, 14B, and 14C are formed in a manner similar to that of the magnetic powder material layer 14 described above.

Note that, as the magnetic powder material forming the magnetic powder material layer 14, permalloy or ferrite (iron oxide) powder can also be used instead of amorphous alloy powder. The polymer material is not limited to resin and may be an organic polymer material or an inorganic polymer material. For example, as the organic polymer material, a natural polymer material, such as protein, nucleic acid, polysaccharide (cellulose, starch, or the like), or natural rubber, or a synthetic polymer material, such as synthetic resin, silicon resin, synthetic fiber, or synthetic rubber, can be used. As the inorganic polymer material, a natural polymer material, such as silicon dioxide (crystal, quartz), mica, feldspar, or asbestos, or a synthetic polymer material, such as glass or synthetic ruby, can be used.

In this manner, the magnetic powder material layer 14 is disposed on the second surface 1S2 of the sensor-substrate main body 1S of the sensor layer 1X so as to cover the X-axis direction loop coil group 12X of the sensor-substrate main body 1S of the sensor layer 1X. This magnetic powder material layer 14 forms a magnetic path that serves as a path for the magnetic field. This configuration can prevent the magnetic field generated by each of the loop coils of the X-axis direction loop coil group 12X and the Y-axis direction loop coil group 12Y from being attenuated and also prevent magnetic noise from being mixed in from outside due to the effect of the metal portion and the like of the circuit board positioned under the sensor-substrate main body 1S.

Figure 4A:
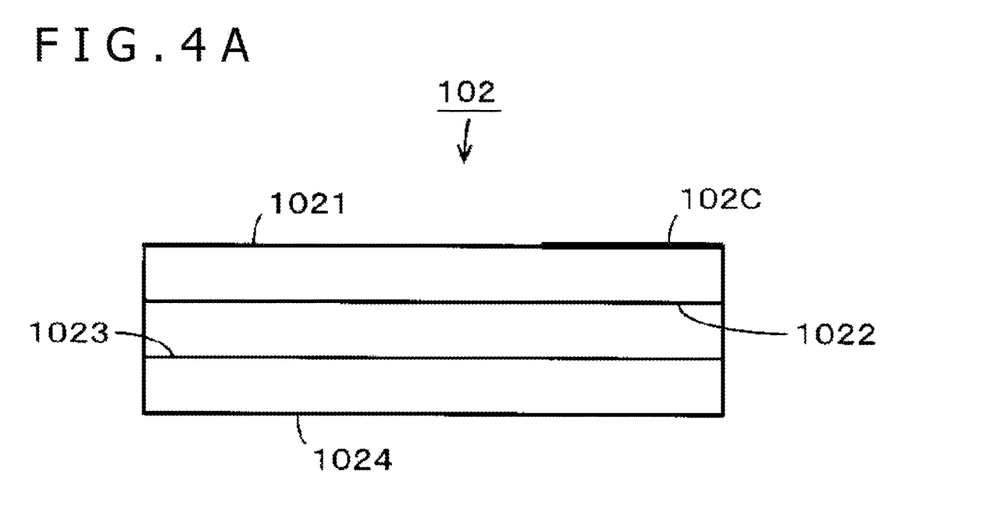
FIGS. 4A and 4B are cross-sectional views for describing an example of a configuration of a circuit board in which a position detection circuitry according to the embodiment is configured.
Figure 4B:
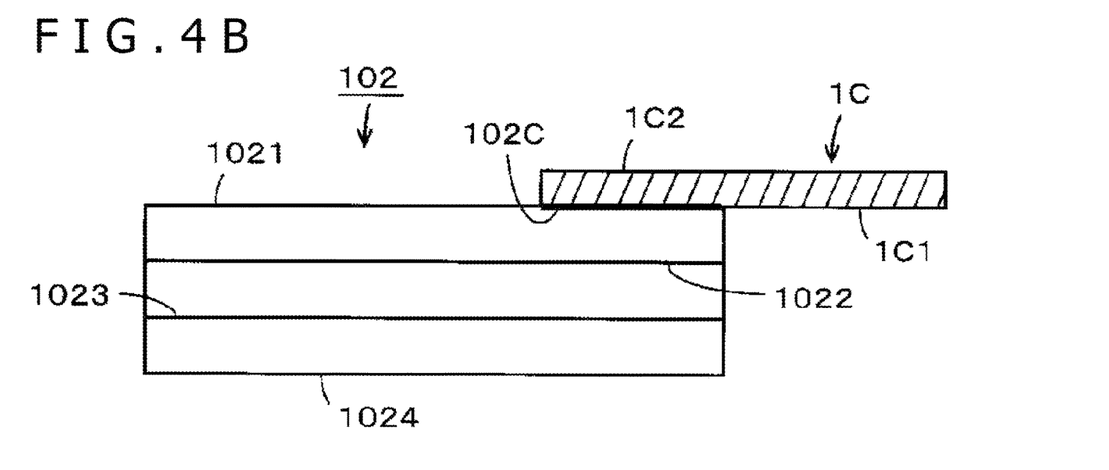

The position detection circuitry (circuit board) 102 is connected on the first surface 1C1 of the cable section 1C. FIGS. 4A and 4B are cross-sectional views for describing an example of a configuration of the circuit board in which the position detection circuitry 102 is configured. As illustrated in FIG. 4A, the position detection circuitry 102 according to the present embodiment has a four-layer structure including a first circuit arrangement surface 1021, a ground layer 1022, a second circuit arrangement surface 1023, and a third circuit arrangement surface 1024.

Each of the first and third circuit arrangement surfaces 1021 and 1024 is a portion where various circuits constituting the position detection circuitry (electronic circuitry) are disposed. Patterns as traces are arranged on the second circuit arrangement surface 1023. The connection portion (cable connection portion) 102C is provided on the first circuit arrangement surface 1021 and connected to each of the line portions of the feed lines of the loop coils of the X-axis direction loop coil group 12X and the Y-axis direction loop coil group 12Y, which are bundled together in the cable section 1C. Therefore, the first circuit arrangement surface 1021 also serves as a cable connection surface. The ground layer 1022 provides a reference potential and is formed of, for example, a metal plate.

The circuits and trace patterns arranged on each of the first to third circuit arrangement surfaces 1021, 1023, and 1024 are appropriately connected to circuits and trace patterns arranged on other surfaces through through-holes formed in the first to third circuit arrangement surfaces 1021, 1023, and 1024 and the ground layer 1022. In this manner, the entire circuit board having the four-layer structure constitutes the single position detection circuitry 102.

As illustrated in FIG. 4B, the feed line of each of the loop coils of the X-axis direction loop coil group 12X and the Y-axis direction loop coil group 12Y, which are led out to the first surface 1C1 of the cable section 1C, is connected to the connection portion 102C of the first circuit arrangement surface 1021. Specifically, one end of the line portion of the feed line of each of the loop coils of the X-axis direction loop coil group 12X and the Y-axis direction loop coil group 12Y is connected to the selection circuit 106 of the position detection circuitry 102 through the connection portion 102C of the first circuit arrangement surface 1021. The other end of the line portion of the feed line of each of the loop coils of the X-axis direction loop coil group 12X and the Y-axis direction loop coil group 12Y is connected to the ground layer 1022 through the connection portion 102C of the first circuit arrangement surface 1021.

Accordingly, the connection end between the line portion of the feed line of each of the loop coils of the X-axis direction loop coil group 12X and the Y-axis direction loop coil group 12Y and the position detection circuitry 102 is formed on the first surface 1C1 side and bent. Therefore, the connection portion between the feed line of each of the loop coils and the position detection circuitry (circuit board) 102 is sandwiched between the position detection circuitry 102 and the sensor-substrate main body 1S and is not exposed to outside. Moreover, as described with reference to FIGS. 4A and 4B, the position detection circuitry 102, which is configured as the circuit board having the four-layer structure, includes the ground layer 1022. This ground layer 1022 prevents the effect of noise. Therefore, the position of the connection portion 102C and the presence of the ground layer 1022 prevent noise from being mixed into the connection portion 102C from outside and also prevent noise from being emitted to outside from the connection portion 102C.

Note that, in the examples of the configuration illustrated in FIGS. 3B to 3E, the connection between the line portion of the feed line of each of the loop coils of the X-axis direction loop coil group 12X and the Y-axis direction loop coil group 12Y and the position detection circuitry 102 is also made in a mode similar to that of connection described with reference to FIG. 4A.

Second Example of Position Detection Device 100

Figure 3B:
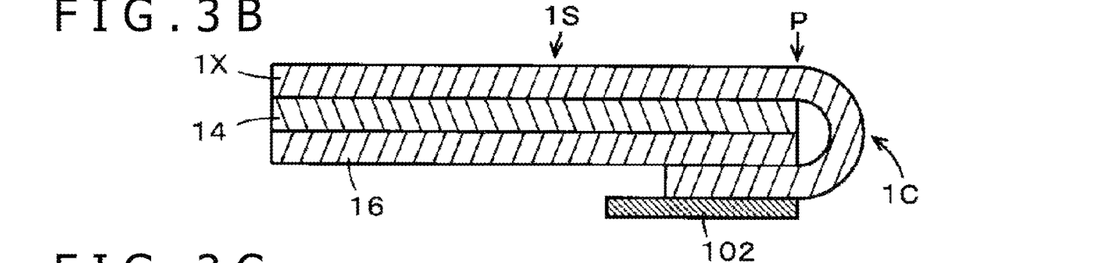

FIG. 3B illustrates a second example of the position detection device 100. The second example is different from the first example described with reference to FIG. 3A in that an electromagnetic shield layer 16 is disposed on the lower side of the magnetic powder material layer 14. That is, the shield layer has a two-layer structure including the magnetic powder material layer 14 and the electromagnetic shield layer 16. In the second example, the electromagnetic shield layer 16 is formed so as to correspond to the magnetic powder material layer 14, and covers the second surface 1S2 of the sensor-substrate main body 1S of the sensor layer 1X but does not cover the second surface 1C2 of the cable section 1C.

Assume that the cable section 1C is bent toward the second surface 1S2 of the sensor-substrate main body 1S. In this case, as illustrated in FIG. 3B, the second surface 1S2 of the sensor-substrate main body 1S and the second surface 1C2 of the cable section 1C face each other across the magnetic powder material layer 14 and the electromagnetic shield layer 16.

The electromagnetic shield layer 16 is a non-magnetic material and prevents electromagnetic noise of integrated circuits (ICs) and various circuits from being mixed into the loop coils of the X-axis direction loop coil group 12X and the Y-axis direction loop coil group 12Y of the sensor layer 1X. Therefore, the electromagnetic shield layer 16 is formed of a metallic material, in this example, aluminum, having low resistance (preferably approximately zero electrical resistance) and high conductivity.

The electromagnetic shield layer 16 formed of aluminum can be deposited on the magnetic powder material layer 14 by, for example, adhesion using an adhesive, pressure bonding, or vapor-depositing aluminum on the magnetic powder material layer 14. When the electromagnetic shield layer 16 is deposited on the magnetic powder material layer 14 by pressure bonding, the magnetic powder material layer 14 may be impregnated with an adhesive material. In the present embodiment, the electromagnetic shield layer 16 is vapor-deposited on the magnetic powder material layer 14.

In this manner, in the case of the second example, the magnetic powder material layer 14 and the electromagnetic shield layer 16 are disposed on the second surface 1S2 side of the sensor-substrate main body 1S of the sensor layer 1X so as to cover the X-axis direction loop coil group 12X of the sensor-substrate main body 1S of the sensor layer 1X. With this configuration, it is possible to more reliably prevent the magnetic field generated by each of the loop coils of the X-axis direction loop coil group 12X and the Y-axis direction loop coil group 12Y from being leaked to outside and also prevent magnetic noise and electrical noise from being mixed in from outside.

In the second example, as with the first example illustrated in FIG. 3A, the position detection circuitry (circuit board) 102 is connected on the first surface 1C1 of the cable section 1C. Therefore, as with the first example illustrated in FIG. 3A, the position of the connection portion 102C and the presence of the ground layer 1022 prevent noise from being mixed into the connection portion 102C from outside and also prevent noise from being emitted to outside from the connection portion 102C.

Third Example of Position Detection Device 100

Figure 3C:
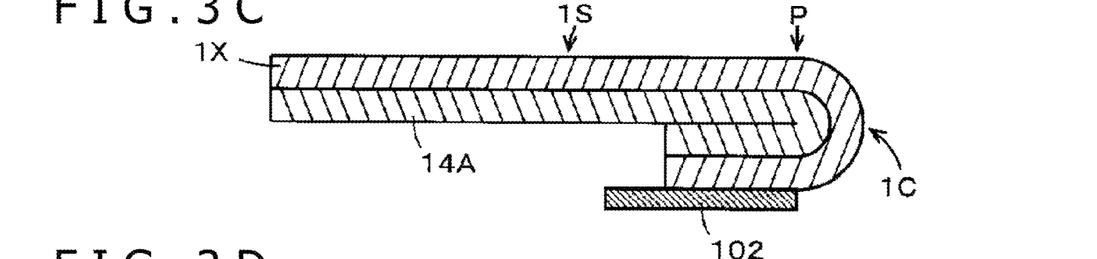

FIG. 3C illustrates a third example of the position detection device 100. In the first example described with reference FIG. 3A, the magnetic powder material layer 14 is disposed only on the second surface 1S2 of the sensor-substrate main body 1S of the sensor layer 1X. In the third example, the magnetic powder material layer 14A is disposed by applying the magnetic powder material in the coating-material form to both the second surface 1S2 of the sensor-substrate main body 1S of the sensor layer 1X and the second surface 1C2 of the cable section 1C of the sensor layer 1X that is contiguous with the second surface 1S2.

Assume that the cable section 1C is bent toward the second surface 1S2 of the sensor-substrate main body 1S. In this case, as illustrated in FIG. 3C, the second surface 1S2 of the sensor-substrate main body 1S and the second surface 1C2 of the cable section 1C face each other across the magnetic powder material layer 14A with two layers (twice the thickness). As with the first and second examples respectively illustrated in FIGS. 3A and 3B, each of the loop coils of the X-axis direction loop coil group 12X and the Y-axis direction loop coil group 12Y is connected to the position detection circuitry 102 on the first surface 1C1 of the cable section 1C.

In the third example, as with the first example, the magnetic powder material layer 14A functions to prevent the magnetic field generated by each of the loop coils of the X-axis direction loop coil group 12X and the Y-axis direction loop coil group 12Y from being attenuated and also prevent magnetic noise from being mixed in from outside. In the case of the third example, moreover, the manufacturing process can be simplified since it is only necessary to apply the magnetic powder material layer 14A to the second surfaces of the sensor layer 1X, that is, both the second surface 1S2 of the sensor-substrate main body 1S and the second surface 1C2 of the cable section 1C.

In the third example, as with the first example illustrated in FIG. 3A, the position detection circuitry (circuit board) 102 is connected on the first surface 1C1 of the cable section 1C. Therefore, as with the first example illustrated in FIG. 3A, the position of the connection portion 102C and the presence of the ground layer 1022 prevent noise from being mixed into the connection portion 102C from outside and also prevent noise from being emitted to outside from the connection portion 102C.

Fourth Example of Position Detection Device 100

Figure 3D:
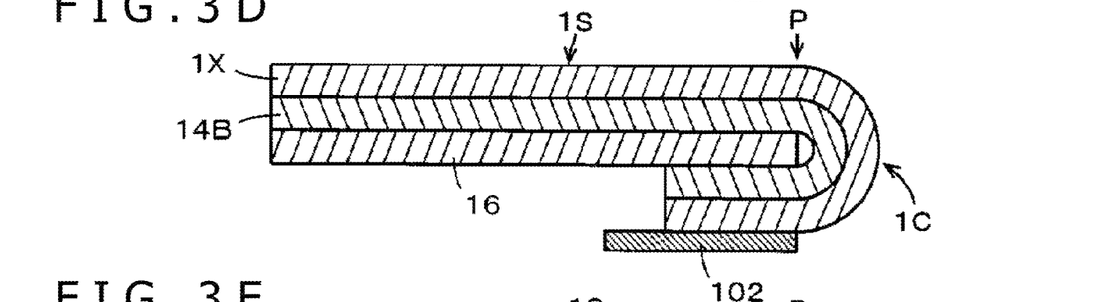

FIG. 3D illustrates a fourth example of the position detection device 100. In the fourth example, as with the third example of the position detection device 100 described with reference to FIG. 3C, the magnetic powder material layer 14B is disposed on both the second surface 1S2 of the sensor-substrate main body 1S of the sensor layer 1X and the second surface 1C2 of the cable section 1C of the sensor layer 1X that is contiguous with the second surface 1S2. As described above, the magnetic powder material layer 14B is deposited by applying the magnetic powder material in the coating-material form.

In the fourth example, as with the second example illustrated in FIG. 3B, the electromagnetic shield layer 16 is disposed on the lower side of the magnetic powder material layer 14B in the portion corresponding to the second surface 1S2 of the sensor-substrate main body 1S of the sensor layer 1X. In other words, the electromagnetic shield layer 16 covers the second surface 1S2 of the sensor-substrate main body 1S of the sensor layer 1X but does not cover the second surface 1C2 of the cable section 1C. The electromagnetic shield layer 16 is deposited by vapor-depositing aluminum on the portion of the magnetic powder material layer 14B corresponding to the second surface 1S2 of the sensor-substrate main body 1S.

Assume that the cable section 1C is bent toward the second surface 1S2 of the sensor-substrate main body 1S. In this case, as illustrated in FIG. 3D, the second surface 1S2 of the sensor-substrate main body 1S and the second surface 1C2 of the cable section 1C face each other across the magnetic powder material layer 14B with two layers and the electromagnetic shield layer 16. As with the first to third examples respectively illustrated in FIGS. 3A to 3C, each of the loop coils of the X-axis direction loop coil group 12X and the Y-axis direction loop coil group 12Y is connected to the position detection circuitry 102 on the first surface 1C1 of the cable section 1C.

In the case of the fourth example, it is possible to obtain advantageous effects similar to those in the second example because of the functions of the magnetic powder material layer 14B and the electromagnetic shield layer 16. That is, it is possible to more reliably prevent the magnetic field generated by each of the loop coils of the X-axis direction loop coil group 12X and the Y-axis direction loop coil group 12Y from being leaked to outside and also prevent magnetic noise and electrical noise from being mixed in from outside.

In the fourth example, as with the first example illustrated in FIG. 3A, the position detection circuitry (circuit board) 102 is connected on the first surface 1C1 of the cable section 1C. Therefore, as with the first example illustrated in FIG. 3A, the position of the connection portion 102C and the presence of the ground layer 1022 prevent noise from being mixed into the connection portion 102C from outside and also prevent noise from being emitted to outside from the connection portion 102C.

Fifth Example of Position Detection Device 100

Figure 3E:
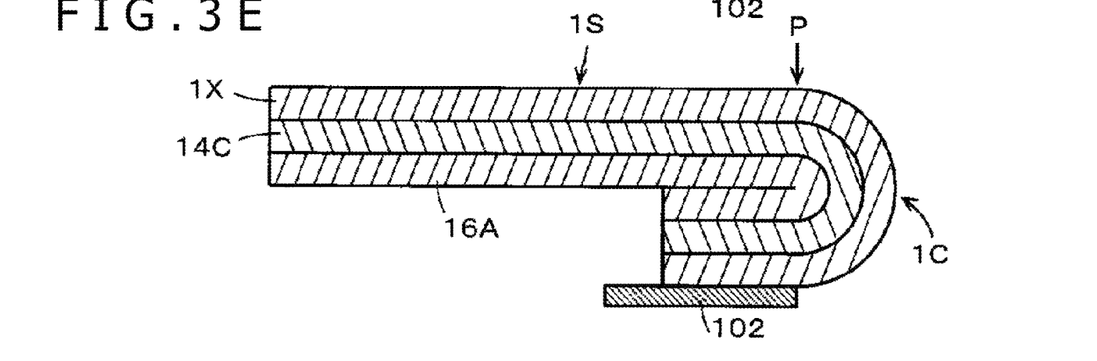

FIG. 3E illustrates a fifth example of the position detection device 100. In the fifth example, as with the fourth example of the position detection device 100 described with reference to FIG. 3D, the magnetic powder material layer 14C is disposed on both the second surface 1S2 of the sensor-substrate main body 1S of the sensor layer 1X and the second surface 1C2 of the cable section 1C of the sensor layer 1X that is contiguous with the second surface 1S2. As with the examples described above, the magnetic powder material layer 14C is deposited by applying the magnetic powder material in the coating-material form to both the second surface 1S2 of the sensor-substrate main body 1S of the sensor layer 1X and the second surface 1C2 of the cable section 1C of the sensor layer 1X that is contiguous with the second surface 1S2.

Moreover, as illustrated in FIG. 3E, an electromagnetic shield layer 16A is disposed on the lower side of the magnetic powder material layer 14C so as to correspond to the magnetic powder material layer 14C. That is, as with the magnetic powder material layer 14C, the electromagnetic shield layer 16A is disposed on both the second surface 1S2 of the sensor-substrate main body 1S of the sensor layer 1X and the second surface 1C2 of the cable section 1C of the sensor layer 1X that is contiguous with the second surface 1S2. The electromagnetic shield layer 16A is deposited by vapor-depositing aluminum on the magnetic powder material layer 14C disposed on both the second surface 1S2 of the sensor-substrate main body 1S of the sensor layer 1X and the second surface 1C2 of the cable section 1C of the sensor layer 1X that is contiguous with the second surface 1S2.

Assume that the cable section 1C is bent toward the second surface 1S2 of the sensor-substrate main body 1S. In this case, as illustrated in FIG. 3E, the second surface 1S2 of the sensor-substrate main body 1S and the second surface 1C2 of the cable section 1C face each other across the magnetic powder material layer 14C with two layers and the electromagnetic shield layer 16A with two layers. As with the first to fourth examples respectively illustrated in FIGS. 3A to 3D, each of the loop coils of the X-axis direction loop coil group 12X and the Y-axis direction loop coil group 12Y is connected to the position detection circuitry 102 on the first surface 1C1 of the cable section 1C.

In the case of the fifth example as well, it is possible to obtain advantageous effects similar to those in the second example because of the functions of the magnetic powder material layer 14C and the electromagnetic shield layer 16A. That is, it is possible to more reliably prevent the magnetic field generated by each of the loop coils of the X-axis direction loop coil group 12X and the Y-axis direction loop coil group 12Y from being leaked to outside and also prevent magnetic noise and electrical noise from being mixed in from outside.

In the case of the fifth example, moreover, the manufacturing process can be simplified since the magnetic powder material layer 14C and the electromagnetic shield layer 16A can be disposed on the second surfaces of the sensor layer 1X, that is, both the second surface 1S2 of the sensor-substrate main body 1S and the second surface 1C2 of the cable section 1C.

In the fifth example, as with the first example illustrated in FIG. 3A, the position detection circuitry (circuit board) 102 is connected on the first surface 1C1 of the cable section 1C. Therefore, as with the first example illustrated in FIG. 3A, the position of the connection portion 102C and the presence of the ground layer 1022 prevent noise from being mixed into the connection portion 102C from outside and also prevent noise from being emitted to outside from the connection portion 102C.

Note that, since the sensor layer ix and the shield layer are denoted as being thick in FIGS. 3A to 3E, the position detection circuitry 102 and the shield layer disposed on the lower side of the sensor-substrate main body 1S appear to be separated from each other. However, each layer is extremely thin, and as described with reference to FIG. 2B, the cable section 1C can be bent toward the second surface 1S2 as if thick paper were folded. Therefore, one of or both the position detection circuitry 102 and the first surface 1C1 of the cable section 1C are fixed to the shield layer including the magnetic powder material layer 14, 14A, 14B, or 14C and/or the electromagnetic shield layer 16 or 16A.

With this configuration, the position detection device 100 according to the present embodiment can be mounted so as to maintain an appropriate state inside the casing of an electronic device without causing such a problem that the position detection circuitry 102 leaves the shield layer and presses on other portions. Note that various methods such as using an adhesive or a tape can be used to fix one of or both the position detection circuitry 102 and the first surface 1C1 of the cable section 1C to the shield layer disposed on the second surface 1S2 side of the sensor-substrate main body 1S.

As illustrated in FIGS. 3A to 3E and FIGS. 4A and 4B, the position detection device 100 according to the present embodiment includes the sensor-substrate main body 1S, the shield layer, the cable section 1C, and the position detection circuitry 102 in this order from the upper side. In addition, the position detection circuitry 102 includes the first circuit arrangement surface 1021, the ground layer 1022, the second circuit arrangement surface 1023, and the third circuit arrangement surface 1024 in this order from the upper side. When viewed as a whole, the position detection device 100 has seven layers in the order of (1) the sensor-substrate main body 1S, (2) the shield layer, (3) the cable section 1C, (4) the first circuit arrangement surface 1021, (5) the ground layer 1022, (6) the second circuit arrangement surface 1023, and (7) the third circuit arrangement surface 1024. The cable section 1C, the first circuit arrangement surface 1021, and the ground layer 1022 are in the middle (the third, fourth, and fifth layers) of the seven layers. Therefore, it can be understood that the connection portion between the feed line of each loop coil and the position detection circuitry 102 is not exposed to outside and, moreover, the ground layer 1022 is positioned under (on the outer side of) the connection portion. Accordingly, it can be understood that this configuration does not cause problems such as noise mixture and noise emission.

Figure 5:
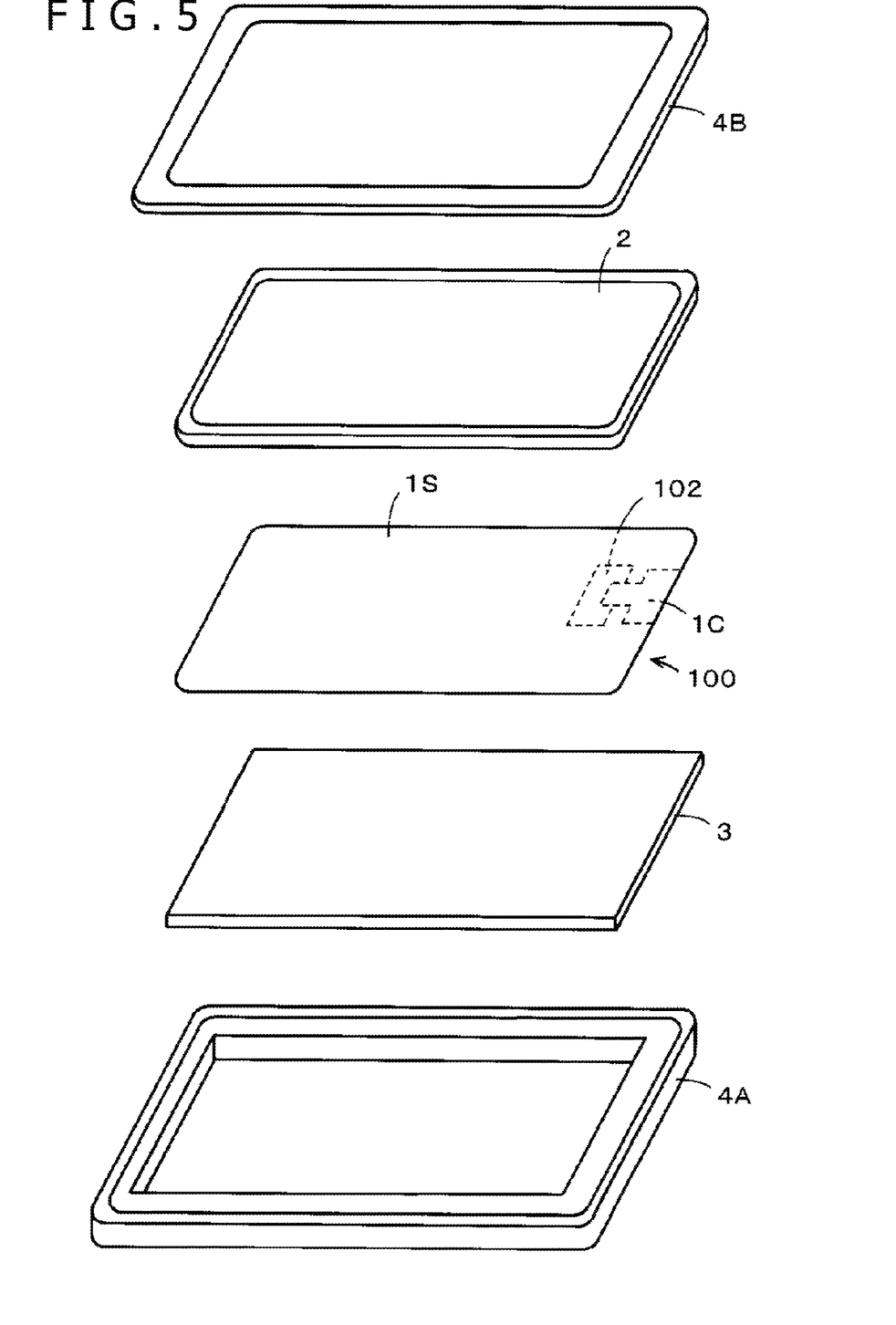
FIG. 5 is a diagram for describing an example of a configuration of an electronic device in which the position detection device according to the embodiment is mounted.

Example of Configuration of Electronic Device in Which Position Detection Device is Mounted FIG. 5 is a diagram for describing an example of a configuration of an electronic device in which the position detection device 100 configured using the position detection sensor of the electromagnetic induction type according to the embodiment is mounted. As described above, the position detection device 100 includes the position detection sensor 1, which includes the sensor-substrate main body 1S and the cable section 1C, the position detection circuitry 102, which is connected to the position detection sensor 1, and the shield layer, which is disposed at least on the lower side of the sensor-substrate main body 1S. The cable section 1C to which the position detection circuitry 102 is connected is folded back toward the lower side of the sensor-substrate main body 1S, as illustrated in FIG. 5.

In the present embodiment, as illustrated in FIG. 5, an LCD 2 is positioned on the upper side of the position detection device 100 and a motherboard 3 is positioned on the lower side of the position detection device 100. The LCD 2, the position detection device 100, and the motherboard 3 stacked in this manner are stored in a casing 4A and sealed by a front panel 4B from the top. The motherboard 3 is what is generally called a printed circuit board on which a power circuit, a control circuit, a communication circuit, a display circuit for LCD, an interface circuit, and the like for realizing the original functions of the electronic device are disposed.

As illustrated in FIG. 5, the sensor-substrate main body 1S of the position detection sensor 1 corresponds to the entire surface of the display screen of the LCD 2, so that any position indicated on the display screen of the LCD 2 can be detected. Further, since the position detection circuitry 102 is positioned under the sensor-substrate main body 1S together with the cable section 1C, approximately the entire upper surface of the casing 4A can be used as the display screen of the LCD2.

The motherboard 3 is positioned on the lower side of the position detection device 100. As described above, in the position detection device 100, the position detection circuitry 102, which is configured as the circuit board, is closest to the motherboard 3. As described with reference to FIGS. 4A and 4B, since the connection portion 102C of the position detection circuitry 102 connected to the feed lines of the coils is located on the side facing the first surface 1C1 of the cable section 1C, the connection portion 102C is not exposed to the motherboard 3 side. Moreover, as described with reference to FIGS. 4A and 4B, the ground layer 1022 is positioned under the connection portion 102C (on the motherboard 3 side). This configuration prevents noise from being mixed in from a circuit section formed on the motherboard 3 through the connection portion 102C of the position detection circuitry 102 connected to the feed lines of the coils. This configuration also prevents noise of the connection portion 102C of the position detection circuitry 102 connected to the feed lines of the coils from being emitted to the circuit section of the motherboard 3 and affecting it.

Moreover, as described with reference to FIGS. 3A to 3E, the shield layer including the magnetic powder material layer 14, 14A, 14B, or 14C and/or the electromagnetic shield layer 16 or 16A is disposed on the lower side (the motherboard 3 side) of the sensor-substrate main body 1S. This configuration can also prevent noise of the circuits formed on the motherboard 3 from affecting the position detection device 100. Needless to say, this configuration can also prevent a signal from each coil of the position detection circuitry 102 from affecting the circuits formed on the motherboard 3.

Advantageous Effects

In the case of the position detection device 100 according to the present embodiment, the position detection circuitry 102 is connected on the first surface 1C1 of the cable section 1C, and the connection portion 102C is not exposed to outside. Further, the position detection circuitry 102, which is configured as the circuit board, includes the ground layer 1022. With this configuration, it is possible to prevent noise from being mixed into the connection portion 102C of the position detection circuitry 102 from outside and also prevent noise of the connection portion 102C from being emitted to outside. This configuration can, therefore, implement a preferred position detection device that can be mounted in an electronic device such as a smartphone or a tablet PC.

As described with reference to FIGS. 3A to 3E, no matter how the shield layer is configured, the mode of connection between the cable section 1C of the position detection sensor 1 and the position detection circuitry 102 does not change. Therefore, the position detection device according to the present embodiment can be implemented in such a way that it is highly resistant to noise without being affected by the configuration of the shield layer.

Modifications

In the embodiment described above, the magnetic powder material layers 14, 14A, 14B, and 14C are formed by applying the magnetic powder material in the coating-material form. Further, the electromagnetic shield layers 16 and 16A are formed by vapor-depositing aluminum. However, how these layers are formed is not limited thereto. Both the magnetic powder material layers 14, 14A, 14B, and 14C and the electromagnetic shield layers 16 and 16A can be formed using various methods as long as they can be formed in the desired places. For example, the magnetic powder material layers 14, 14A, 14B, and 14C and the electromagnetic shield layers 16 and 16A may be formed in a sheet form and adhered to the position detection sensor 1.

According to the form of the material to be deposited and the characteristics of a deposition target on which the material is deposited, various methods such as application, vapor deposition, fusion bonding, and pressure bonding can be employed to deposit the magnetic powder material layer and the electromagnetic shield layer on the sensor layer 1X. Further, as long as the magnetic powder material layer and the electromagnetic shield layer are not displaced from the sensor layer 1X, it is not necessary to adhere the entire surfaces of the magnetic powder material layer and the electromagnetic shield layer to the respective deposition targets. Therefore, when a magnetic powder material in the sheet form or aluminum in the sheet form is employed, the magnetic powder material in the sheet form or aluminum in the sheet form only needs to be fixed at several portions such as edges of the deposition target.

Note that, although the position detection circuitry 102 is described as having a four-layer structure in the embodiment described above, the configuration of the position detection circuitry 102 is not limited thereto. It suffices that the position detection circuitry 102 includes, for example, a cable connection surface, a circuit arrangement surface, and a ground layer. Further, the connection portion (cable connection portion) connected to the line portions of the feed lines of the coils and the circuit arrangement portion may be formed on the same surface. In this case, the connection portion connected to the coils needs to be connected to each loop coil so as to face the first surface 1C1 of the cable section 1C. Accordingly, the position detection circuitry 102 can have various structures such as a single-layer structure, a two-layer structure, a three-layer structure, and a four-layer structure.

Although the present invention is applied to the position detection device including the position detection sensor and the position detection circuitry of the electromagnetic induction type in the embodiment described above, the present invention is not limited to the embodiment. The present invention can also be applied to a position detection device using a position detection sensor of a capacitive type or a position detection device using a position detection sensor of an active capacitive coupling type.

Note that the position detection sensor of the capacitive type or the active capacitive coupling type includes a sensor in which a plurality of linear conductors (line electrodes) are arranged in each of the X-axis direction and the Y-axis direction. The position detection sensor detects the indicated position, according to a change in capacitance (electric charges) that occurs in each of the linear conductors when a finger or a capacitive pen approaches the sensor. The linear conductors in this case are led out to a cable section and connected to a position detection circuitry. The cable section and the position detection circuitry to which the cable section is connected can be configured in a manner similar to that of those described with reference to FIGS. 2A to 5.

It is to be noted that the embodiment of the present invention is not limited to the foregoing embodiment, and that various changes can be made based on the principles disclosed in the present disclosure.

The invention claimed is:

1. A position detection device comprising:
   a position detection sensor that is used with a position indicator and includes
      a sensor-substrate main body including electrodes configured to accept an indication input from the position indicator, and
      a cable section to which the electrodes are led out; and
   a circuit board in which a position detection circuitry, to which the position detection sensor is connected, is configured,
   wherein the sensor-substrate main body of the position detection sensor includes an insulating substrate having a first surface that is located on a side where a position is to be indicated by the position indicator and a second surface that is located on an opposite side of the first surface,
   conductors constituting the electrodes are formed on the first surface and the second surface,
   a shield layer is disposed on an entire surface of the second surface so as to cover the electrodes formed on the second surface, and
   the circuit board is connected to the cable section of the position detection sensor on a surface of the cable section contiguous with the first surface of the sensor-substrate main body, and when the cable section is bent toward the second surface of the sensor-substrate main body, the circuit board is positioned at a lowermost layer of the position detection device.

2. The position detection device according to claim 1, wherein the circuit board connected to the cable section has at least a cable connection surface to which each of the electrodes of the cable section is connected and a ground layer configured to provide a reference potential, and the cable connection surface is located on a side facing the surface of the cable section contiguous with the first surface and is connected to the cable section.

3. The position detection device according to claim 1, wherein the sensor-substrate main body and the cable section included in the position detection sensor are integrally formed as a flexible substrate.

4. The position detection device according to claim 1, wherein one of or both the cable section and the circuit board are fixed to the shield layer disposed on the second surface of the sensor-substrate main body.

5. The position detection device according to claim 1, wherein the shield layer has a two-layer structure including a magnetic shield layer and an electromagnetic shield layer.

6. The position detection device according to claim 1, wherein the position detection device is disposed and used on a lower side of a display screen of a thin display device.

7. The position detection device according to claim 1, wherein the position detection device is disposed and used on an upper side of a circuit section of an electrical device in which the position detection device is mounted.

8. The position detection device according to claim 1, wherein the electrodes configured to accept the indication input from the position indicator are loop coils for electromagnetic coupling with the position indicator including a resonant circuit, and include a first plurality of loop coils arranged in a first direction and a second plurality of loop coils arranged in a second direction intersecting the first direction, and the first plurality of loop coils are arranged on the first surface of the insulating substrate and the second plurality of loop coils are arranged on the second surface of the insulating substrate.

\* \* \* \* \*